US011275788B2

(12) United States Patent
Tortosa et al.

(10) Patent No.: US 11,275,788 B2
(45) Date of Patent: Mar. 15, 2022

(54) CONTROLLING INFORMATION STORED IN MULTIPLE SERVICE COMPUTING SYSTEMS

(71) Applicant: International Business Machines Corporation, Armonk, NY (US)

(72) Inventors: Andrea Tortosa, Rome (IT); Paolo Bianchini, Rome (IT); Flavio Pinzauti, Rome (IT); Carlo Di Domenico, Rome (IT)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 16/658,255

(22) Filed: Oct. 21, 2019

(65) Prior Publication Data

US 2021/0117481 A1  Apr. 22, 2021

(51) Int. Cl.
| | |
|---|---|
| *H04L 67/10* | (2022.01) |
| *G06F 16/903* | (2019.01) |
| *G06Q 30/02* | (2012.01) |
| *H04L 67/53* | (2022.01) |
| *H04L 29/06* | (2006.01) |
| *G06Q 50/26* | (2012.01) |

(52) U.S. Cl.
CPC ... *G06F 16/90335* (2019.01); *G06Q 30/0201* (2013.01); *H04L 63/20* (2013.01); *H04L 67/10* (2013.01); *H04L 67/20* (2013.01); *G06Q 50/265* (2013.01)

(58) Field of Classification Search
CPC ....... H04L 67/10; H04L 63/102; H04L 63/20; H04L 67/20; G06F 16/90335; G06Q 50/265; G06Q 30/0201
USPC ......................................................... 707/769
See application file for complete search history.

(56) References Cited

U.S. PATENT DOCUMENTS

| | | | | |
|---|---|---|---|---|
| 2012/0137367 | A1* | 5/2012 | Dupont ................... | G06F 21/00 726/25 |
| 2013/0325977 | A1 | 12/2013 | Drews et al. | |
| 2014/0025660 | A1* | 1/2014 | Mohammed ....... | G06Q 30/0241 707/722 |
| 2014/0122608 | A1* | 5/2014 | Liu ....................... | H04L 67/104 709/204 |
| 2017/0220926 | A1 | 8/2017 | Chhabra et al. | |

(Continued)

FOREIGN PATENT DOCUMENTS

JP   2010097336 A   4/2010

OTHER PUBLICATIONS

Beigi et al., "Privacy in Social Media: Identification, Mitigation and Applications", ACM Trans. Web, vol. 9, No. 4, Article 39, Jul. 2018, 36 pages, <https://arxiv.org/pdf/1808.02191>.

*Primary Examiner* — Frantz B Jean
(74) *Attorney, Agent, or Firm* — Edward J. Wixted, III

(57) ABSTRACT

In an approach, a processor retrieves an indication of a plurality of service computing systems storing corresponding information bunches, pertaining to a subject, that are available to a third party. A processor collects the corresponding information bunches from the service computing systems. A processor generates enriched information pertaining to the subject according to a combination of the corresponding information bunches. A processor verifies the enriched information against a security rule. A processor outputs a result of the verification of the enriched information to the subject.

19 Claims, 9 Drawing Sheets

(56) References Cited

U.S. PATENT DOCUMENTS

2017/0374072 A1  12/2017  Steinberg et al.
2019/0295101 A1* 9/2019  Porter .................. G06Q 30/018

* cited by examiner

| server1 | | | |
|---|---|---|---|
| timeA | placeA | | |
| timeB | placeB | personB | reasonB |

| server2 | | | |
|---|---|---|---|
| timeA | | personA | |
| timeB+Δt | placeB | personB | reasonB |
| timeC | placeC | | |

| server3 | | | |
|---|---|---|---|
| timeA | | | reasonA |
| timeC | | personC | |

FIG.5A

| | | | |
|---|---|---|---|
| timeA | placeA (server1,timeA) | personA (server2,timeA) | reasonA (server3,timeA) |
| timeB | placeB (server1,timeB) | personB (server1,timeB) | reasonB (server1,timeB) |
| timeB+Δt (timeB) | placeB (server2,timeB+Δt) | personB (server2,timeB+Δt) | reasonB (server2,timeB+Δt) |
| timeB+2·Δt (timeB+Δt) | placeB | personB | reasonB |
| timeC | placeC (server2,timeC) | personC (server3,timeC) | |

FIG.5B

| timeA | placeA (server1,timeA) | personA (server2,timeA) | reasonA (server3,timeA) |
|---|---|---|---|
| timeB | placeB (server1,timeB) | personB (server1,timeB) | reasonB (server1,timeB) |
| timeB+Δt (timeB) | placeB (server2,timeB+Δt) | personB (server2,timeB+Δt) | reasonB (server2,timeB+Δt) |
| timeB+2·Δt (timeB+Δt) | placeB | personB | reasonB |

FIG.5C

| |
|---|
| At the dayA you were at the placeA with the personA for the reasonA.  [server2,timeA] |
| At the dayB you were at the placeB with the personB for the reasonB.  [server2,timeB] |
| At the dayB+Δt you were at the placeB with the personB for the reasonB.  [timeB]  [server3,timeB+Δt] |
| At the dayB+2·Δt you will be at the placeB with the personB for the reasonB.  [timeB+Δt] |

FIG.5D

CONTROLLING INFORMATION STORED IN MULTIPLE SERVICE COMPUTING SYSTEMS

BACKGROUND

The present invention relates generally to the field of information technology, and more particularly to the control of information in computing systems.

Control of information (stored in computing systems) is a key issue in several contexts. Particularly, whenever the information is particularly relevant for corresponding subjects, it is important to control access to the information by third parties. A typical example is personal information, i.e., information relating to identifiable persons. Indeed, the access to personal information by third parties may involve privacy exposure to the corresponding people.

Social network services are used to share information among people having similar interests, activities, or connections. Social network services typically allow a user to create a profile, post photographs, send messages, and the like.

SUMMARY

Aspects of an embodiment of the present invention disclose a method, computer program product, and computing system. A processor retrieves an indication of a plurality of service computing systems storing corresponding information bunches, pertaining to a subject, that are available to a third party. A processor collects the corresponding information bunches from the service computing systems. A processor generates enriched information pertaining to the subject according to a combination of the corresponding information bunches. A processor verifies the enriched information against a security rule. A processor outputs a result of the verification of the enriched information to the subject.

BRIEF DESCRIPTION OF THE DRAWINGS

FIG. 5A-FIG. 5D depict an exemplary scenario of an application of an embodiment of the present invention.

DETAILED DESCRIPTION

Figure 1A:
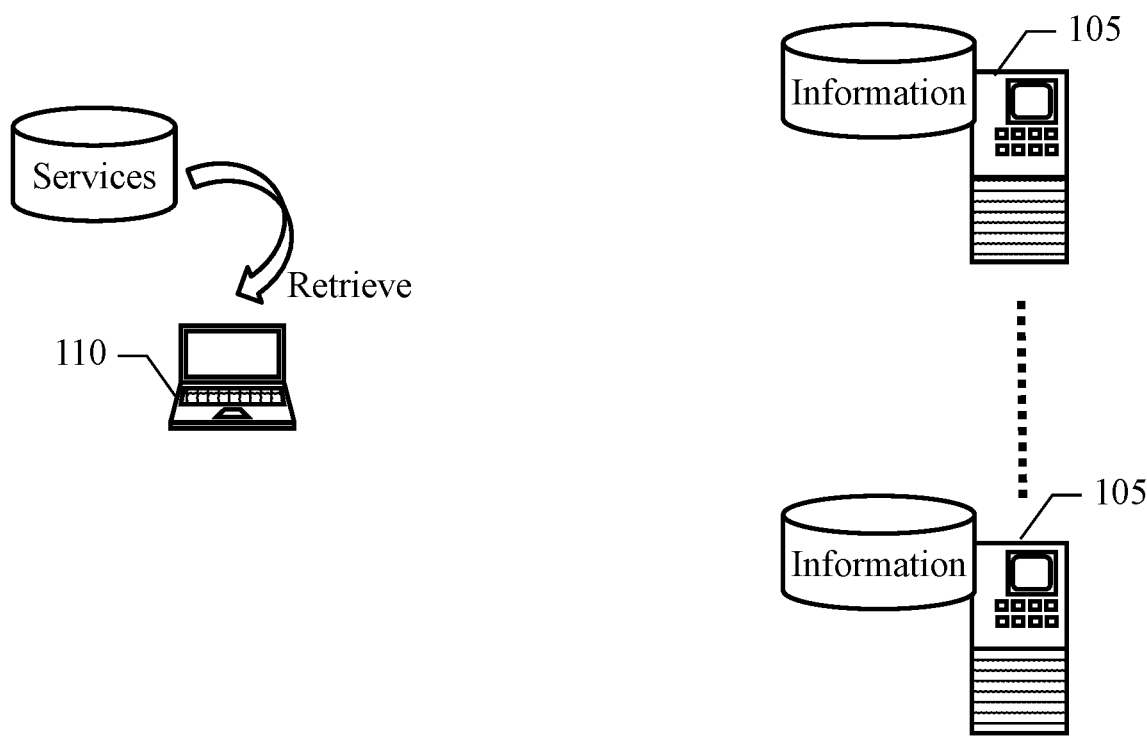
FIG. 1A-FIG. 1D depict a computing environment according to an embodiment of the present invention.

Embodiments of the present invention recognize that the widespread diffusion of the Internet poses several concerns about the privacy of the people accessing the Internet. Particularly, social network services are routinely used to share information among people having similar interests, activities, or connections (for example, for maintaining contacts, building relations, or exchanging information); typical examples are services where people registered as users thereof may create a profile revealing details about themselves and they may post photographs, messages, and multimedia.

By design, social network services share information of their users to operate. As a result, information pertaining to the users, comprising personal information thereof, may become accessible to third parties.

Embodiments of the present invention recognize that users may not pay attention to their privacy settings, or may not be made aware of all available privacy settings, in the social network services they interact with. Indeed, many users are not aware of the risks that may be caused by the sharing of personal information in a social network service (for example, because the user trusts the company implementing the social network service). Moreover, even when users are aware of such risks, some users may not understand that the risks may apply to them individually. Therefore, it is very common for users to maintain the default values for privacy settings regardless of how much usage those default values allow for regarding their information. Moreover, even if users update their privacy settings, default values sometimes are restored after maintenance operations of a social network service.

Much information that is submitted to social network services is public (i.e., accessible by everyone). In any case, even when the information that is submitted to a social network is private (i.e., accessible only by correlated users of the same social network services, for example, friends), the privacy settings may allow the information to be shared beyond just the authorized users (for example, by friends of friends as well). As a result, the information is often disseminated further than expected.

Many users interact with a relatively high number of social networks for a variety of different purposes (for example, to publish content, to chat, to communicate, and so on). These interactions result in the possible dissemination of personal information of the user.

Embodiments of the present invention recognize that the sharing of information in several social network services may bring about unexpected, and generally, undesired effects. Particularly, this may occur even when the information that is shared in each social network service does not by itself create any security exposure. However, third parties may collect information of a single person from multiple social network services. As a result, it is possible for the third parties to gain access to a large amount of personal information of individual users.

Embodiments of the present invention recognize that specific pieces of personal information that are not critical, per se, may become so when the specific pieces of personal information are combined. For example, a user posts a message to a first social network service indicating that he/she is at a certain place at a certain time; moreover, the user posts a photograph to a second social network service tagged with the same time showing him/her together with a certain person. This may appear as acceptable to the user, since the message alone only indicates where the user was and the photograph alone only indicates with whom the user was. However, combining the information together allow one to infer that the user, at a certain time, was a certain place with a certain person. This may allow for unwanted personal information to be obtained by third parties.

With reference in particular to FIG. 1A-FIG. 1D, the general principles of an embodiment of the present invention are shown according to an embodiment of the present disclosure.

Starting from FIG. 1A, a plurality of service computing systems, for example, servers 105 implement corresponding social network services (for sharing information among persons having similar interests, activities or connections); for example, the social network services provide publishing, instant-messages, chat, forum, and so on, services. Each of the servers 105 stores corresponding information of the people registered as users thereto (for example, messages, texts, photographs, videos, and so on). The information stored in the servers 105 may be available to third parties (for example, because a post has been made public). An indication of the servers 105, where a specific user is registered (such as provided by the user himself/herself), is retrieved by a control computing system, for example, a client 110 of the user.

Figure 1B:
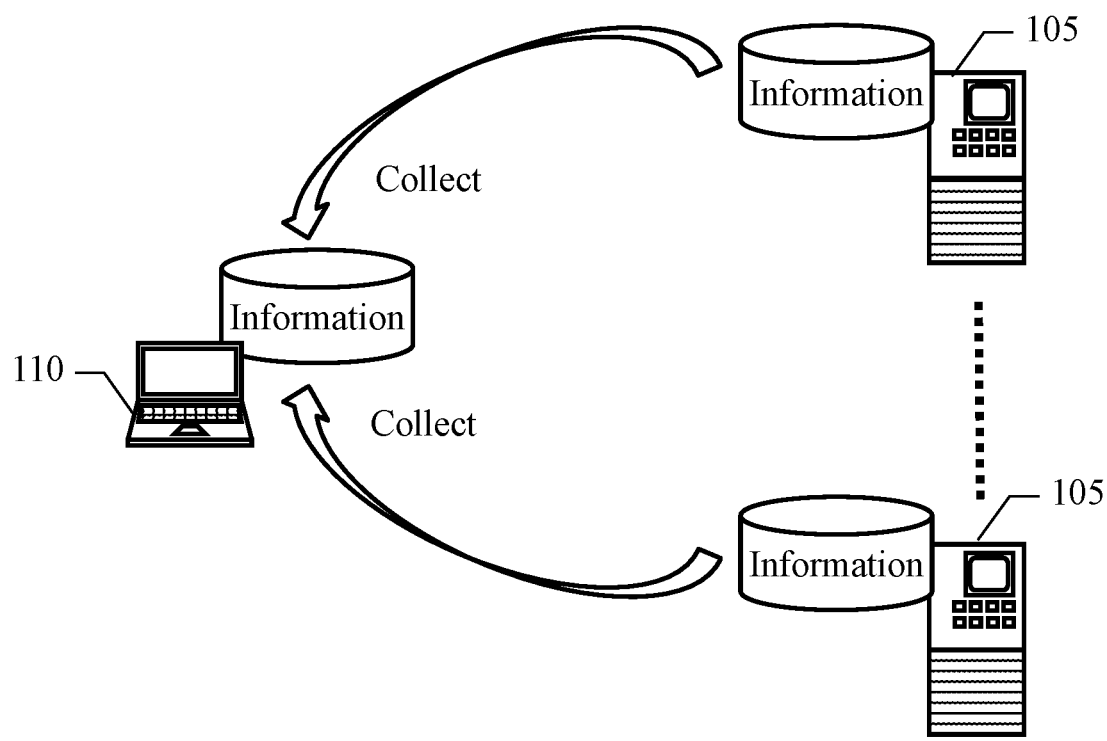

Moving to FIG. 1B, client 110 collects the information pertaining to the user from the corresponding servers 105; for example, client 110 downloads the information of the users from the servers 105 utilizing one or more data crawling techniques.

Figure 1C:
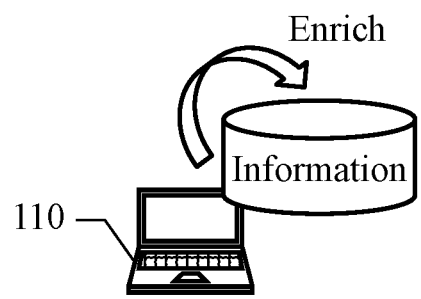

Moving to FIG. 1C, client 110 generates enriched information pertaining to the user according to a combination of the information from the servers 105; for example, (partial) activities indicated in each part of the information over time are enriched according to compatible (partial) activities indicated in the other parts of information (e.g., information from a first and a second social media network) to provide an indication of activities of the user.

Figure 1D:
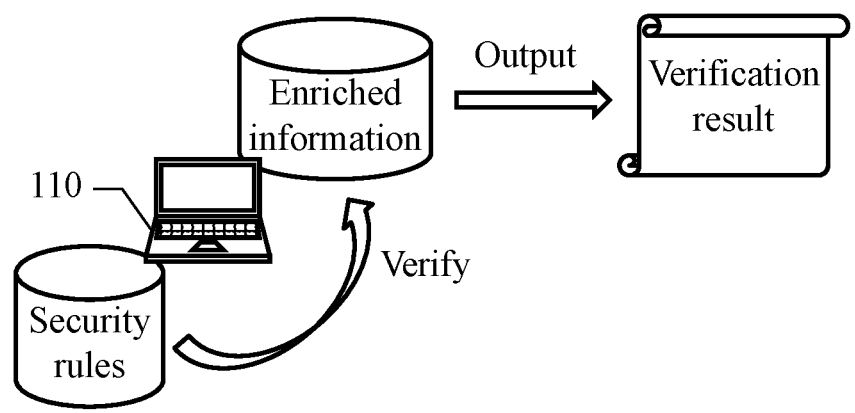

Moving to FIG. 1D, client 110 verifies the enriched information against one or more security rules (for example, defined by the user). The verification of the enriched information provides a corresponding (verification) result; for example, the verification result indicates activities which are not compliant with the security rules, possibly together with an indication of the (partial) activities which have contributed to define them. The verification result is then output (for example, by displaying a corresponding report on a monitor of the client 110).

For example, a user does not want to make information known to third parties that indicates where he/she was, and with whom, at a certain time frame. For this purpose, the user defines a corresponding security rule. In one example, a user posts a message on a social networking platform indicating that he/she is at a certain place at a certain time and posts a photograph to another social networking service, tagged with the same time, showing him/her together with a certain person. In this case, the corresponding information from the two social networking platforms (indicating where, at a time, and with whom at the time, respectively) are collected from the servers 105 implementing these social network services. The enriched information, which is obtained by combining the information from the different servers 105 (i.e., different social networking platforms), indicates that the user, at a certain time, was at certain place, with a certain person. The activity, so obtained, is in not compliant with the above-mentioned security rule. Therefore, an indication of the activity and of the information (from the corresponding social network services) contributing to define the activity is displayed or otherwise presented to one or more of the impacted users. The user may then react accordingly, for example, by removing the corresponding information from one or more of the social network services, or by adjusting privacy settings of the profile and/or posted content.

The above-described solution significantly improves the control of the personal information, and particularly reduces any security exposure that may result from its sharing among third parties.

In this way, it is possible to avoid, or at least substantially reduce, any unexpected effect resulting from the potential sharing of the personal information with unanticipated third parties. More specifically, the proposed solution prevents third parties from gaining access to any combinations of personal information, which may be used to draw inferences about the user, and are unacceptable to the user. This result may be achieved even if the personal information is resulting from the combination of specific pieces of personal information, that each individually are not critical per se, that may have been posted individually by the user to different social network services.

Figure 2:
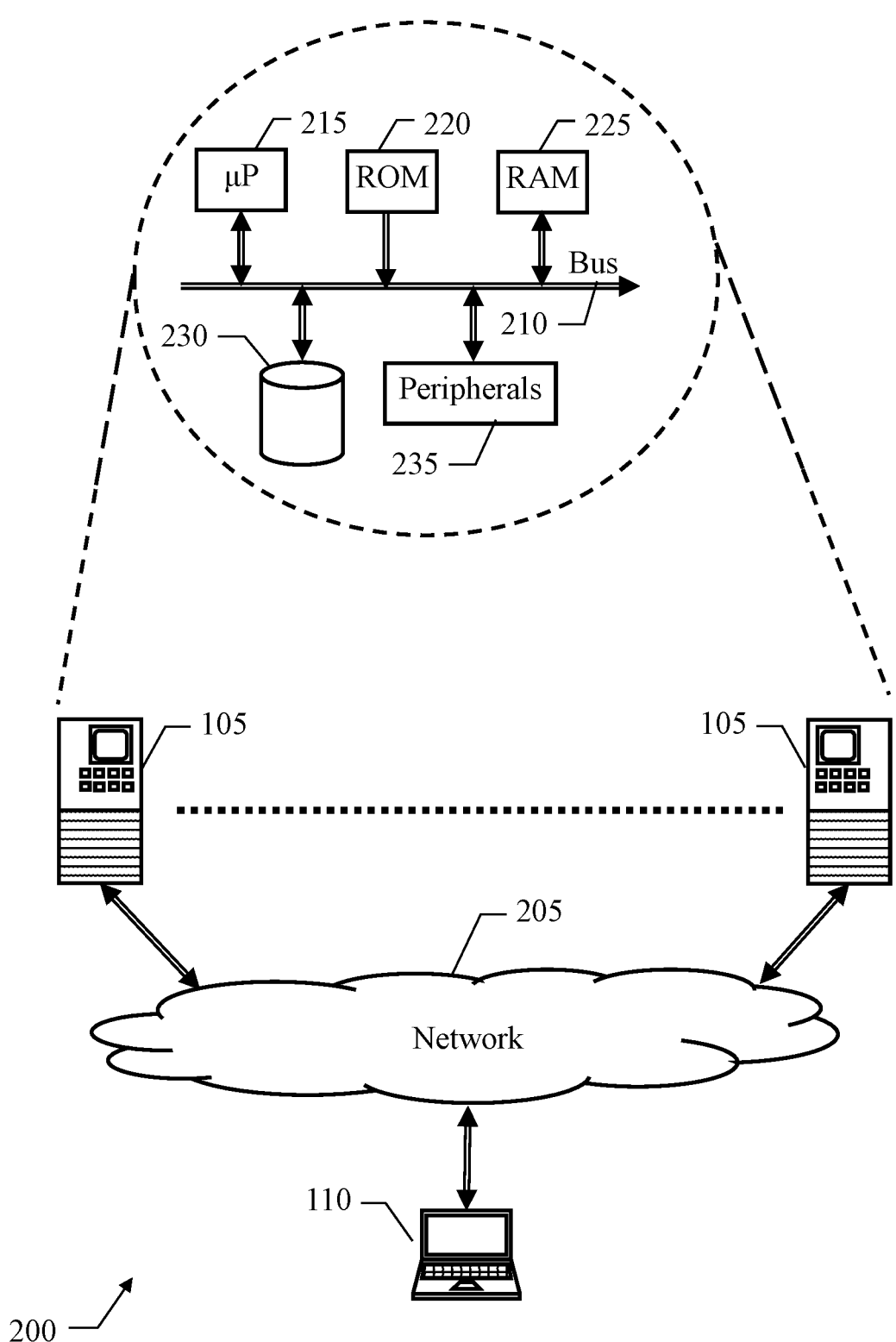
FIG. 2 depicts a schematic block diagram of an information technology infrastructure, in accordance with an embodiment of the present invention.

With reference now to FIG. 2, a schematic block diagram is shown of an information technology infrastructure 200 wherein the solution according to an embodiment of the present disclosure may be practiced.

The information technology infrastructure 200 comprises the above-mentioned servers 105 and client 110 (called computers 105-110 as a whole). The computers 105-110 communicate over a (telecommunication) network 205. For example, the information technology infrastructure 200 is based on the Internet. In this case, the servers 105 are web servers which are connected one to another through the network 205 being of global type; the client 110 accesses the Internet (through corresponding access providers, not shown in the figure), in order to exploit the social network services implemented by the servers 105.

Each one of the computers 105-110 comprises several units which are connected among them through a bus structure 210 with one or more levels (with an architecture that is suitably scaled according to the type of the computer 105-110). Particularly, one or more microprocessors (μP) 215 control operation of the computer 105-110; a non-volatile memory (ROM) 220 stores basic code for a boot-strap of the computer 105-110 and a volatile memory (RAM) 225 is used as a working memory by the microprocessors 215. The computer 105-110 is provided with a mass-memory 230 for storing programs and data (for example, storage devices of corresponding data centers wherein the servers 105 are implemented and a hard disk for the client 110). Moreover, the computer 105-110 comprises a number of controllers for peripherals, or Input/Output (I/O) units, 235; for example, the peripherals 235 of each server 105 comprise a network card for plugging the server 105 into the corresponding data center and then connecting it to a console of the data center (for example, a personal computer, also provided with a drive for reading/writing removable storage units, such as optical disks like DVDs) and to a switch/router sub-system of the data center (for its communication with the network 205), whereas the peripherals 235 of the client 110 comprise a keyboard, a mouse, a monitor, a network adapter (NIC) for connecting to the network 205 and a drive for reading/writing removable storage units as above.

Figure 3:
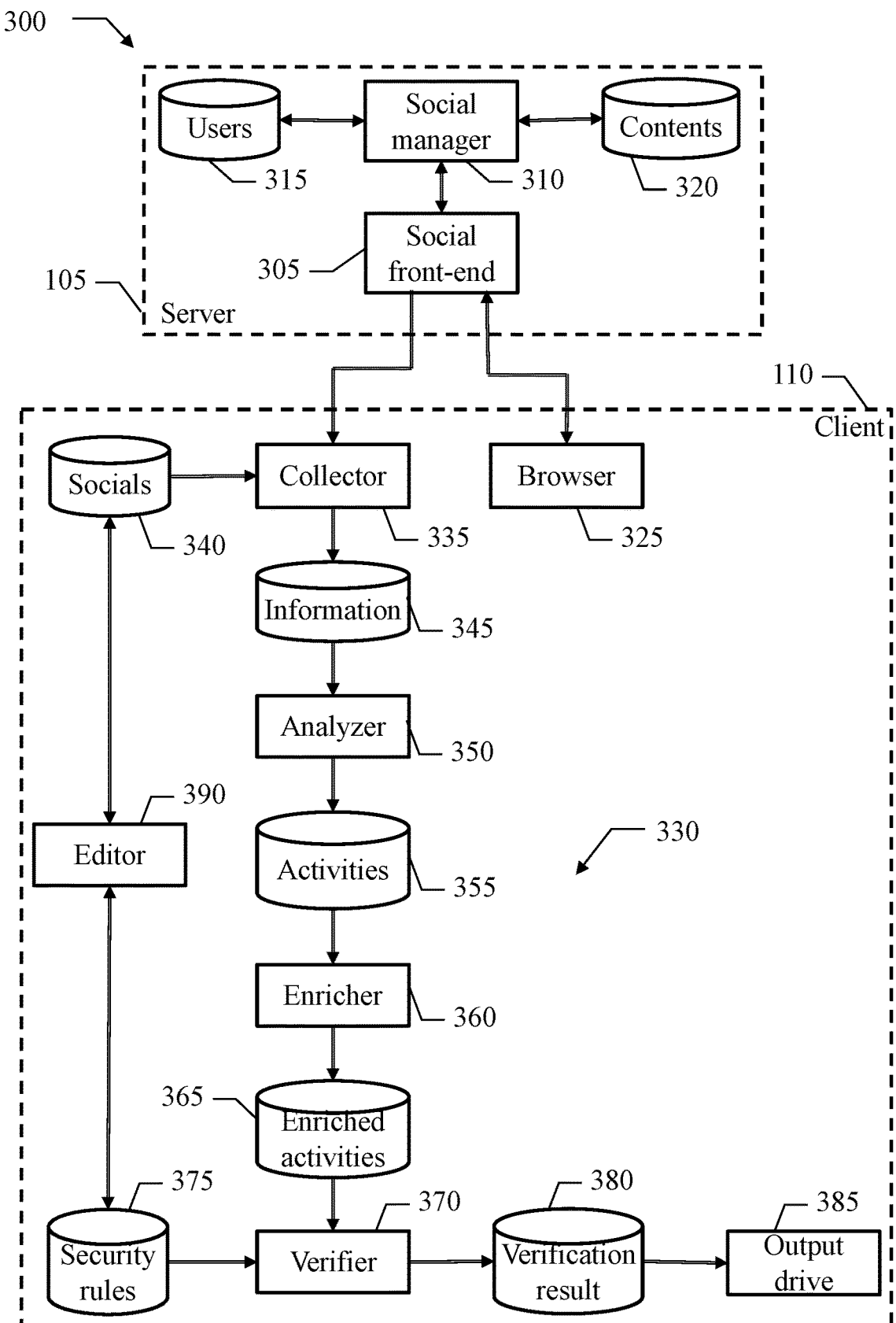
FIG. 3 depicts software components that may be used to implement one embodiment of the present invention.

With reference now to FIG. 3, the main software components are shown that may be used to implement the solution according to an embodiment of the present disclosure.

The software components 300 are typically stored in the mass memories and loaded (at least in part) into the working memories of the computers 105-110 when the programs are running. The programs are initially installed into the mass memories, for example, from removable storage units or from the network (not shown in the figure). In this respect, each program may be a module, segment or portion of code, which comprises one or more executable instructions for implementing the specified logical function.

Starting from each server 105 (only one shown in the figure), it comprises the following components. A social front-end 305 provides a front-end of the social network service implemented by the server 105. A social manager 310 manages the social network service; for example, this includes registration of (new) users, access by (registered) users, posting of (new) contents, downloading of (posted) contents and so on. The social manager 310 interacts with the social front-end 305, and it accesses (in read/write mode) a user repository 315 and a content repository 320. The user repository 315 defines the persons that are registered as users to the social network service. The user repository 315 comprises an entry for each user having a (user) account in the social network service. The entry stores a (user) identifier of the user (for example, his/her e-mail address), a password for accessing the user account and a (user) profile of the user (containing details thereof, for example, name, age, residence, telephone number, job, hobbies, privacy settings and the like, and control information for the use of the social network service, for example, other users defined as friends, other users to whom the user has subscribed as follower and so on). The content repository 320 holds contents that have been posted to the social network service by its users. The content repository 320 comprises an entry for each post. The entry stores a time stamp of the post, a content of the post (for example, a text, a photograph, a video, a vocal message and so on) and information relating thereto (for example, the user identifier of the user which has posted it, a chain of forwarding, possible evaluations by other users, such as like or dislike, and so on).

Moving to the client 110, it comprises the following components. A (web) browser 325 is used to surf the Internet, and particularly to access the social network services on the different servers 105 via their social front-end 305. In the solution according to an embodiment of the present disclosure, an information control application 330 is used to control the information of the user which has been shared in the social network services. More in detail, the information control application 330 comprises the following components. A collector 335 collects the information pertaining to the user from the servers 105, via their social front-end 305 as well. The collector 335 accesses (in read mode) a social table 340 and accesses (in write mode) an information repository 345. The social table 340 indicates a list of (relevant) social network services wherein the user is registered. The social table 340 comprises an entry for each of the relevant social network services. The entry stores a (social network) label of the relevant social network service (for example, its commercial name), a (server) identifier of the server 105 implementing it (for example, its domain name) and the user identifier of the user in the relevant social network service. The information repository 345 holds information pertaining to the user in the relevant social network services. The information repository 345 comprises an entry for each relevant social network service. The entry stores the corresponding server identifier and an information bunch composed of the information pertaining to the user which has been collected from the relevant social network service over a certain collection period. An analyzer 350 analyzes each information bunch to determine (assumed) activities of the user in the collection period. The analyzer 350 accesses (in read mode) the information repository 345 and it accesses (in write mode) corresponding activity maps 355 for the relevant social network services. Each activity map 355 indicates the relevant social network service (for example, by its server identifier) and it comprises a plurality of entries for corresponding time slots of the collection period (for example, every hour). Each entry stores an (activity) definition of an activity of the user in the time slot. The activity definition is composed of one or more (activity) properties of the activity; for example, a time (activity) property indicates a time of the activity (either explicitly or implicitly by the corresponding time slot), a place (activity) property indicates a place of the activity, a person (activity) property indicates one or more persons accompanying the user in the activity and a reason (activity) property indicates a reason of the activity. An enricher 360 enriches the activities of the user in the collection period. The enricher 360 accesses (in read mode) the activity maps 355 and it accesses (in write mode) one or more enriched activity maps 365. Each enriched activity map 365 comprises a plurality of entries for the same time slots as above. Each entry stores an (enriched) activity definition (of the activity of the user in the time slot) composed of one or more activity properties as above, with the addition of one or more originating pointers for each activity property; each originating pointer indicates the (contributing) activity definition of the (contributing) activity in one of the activity maps contributing to define it (identified by the corresponding server identifier and time slot). Moreover, in case of a (recurring) activity that is recurring over time in a corresponding sequence, the entry further comprises a backward pointer to a previous occurrence of the recurring activity in the sequence (defined by its time slot). A verifier 370 verifies the (enriched) activities of the user against the security rules. The verifier 370 accesses (in read mode) the enriched activity maps 365 and a security rule repository 375. The security rule repository 375 defines security rules for controlling the information of the user shared in the social network services. The security rule repository 375 comprises an entry for each security rule. The security rule indicates an (activity) type of an activity which the user does not want to be available to third parties; the activity type is defined by a combination of two or more (property) types of activity properties, in the example at issue "when" (time property), "where" (place property), "who" (person property) and "why" (reason property). Moreover, the verifier 370 accesses (in write mode) a verification result table 380. The verification result table 380 indicates a (verification) result of the verification of the activities against the security rules. The verification result table 380 comprises an entry for each activity in a certain verification window, or at least for any (non-compliant) activities which are not compliant with the security rules. The entry stores the activity definition of the non-compliant activity, its originating pointer (if any) and its backward pointer (if any); in case the verification result table 380 is extended to the other (compliant) activities as well in the verification window, the entry further comprises a compliance flag for differentiating the non-compliant activities and the complaint activities (for example, compliance flag deasserted and asserted, respectively). An output drive 385 outputs an indication of the verification result, for example, by interacting with a monitor drive, an e-mail client and so on (not shown in the figure). The output drive 385 accesses (in read mode) the verification result table 380. An editor 390 is used to maintain (i.e., view, create, update and delete) the list of relevant social network services and the security rules. The editor 390 accesses (in read/write mode) the social table 340 and the security rule repository 375.

Figure 4A:
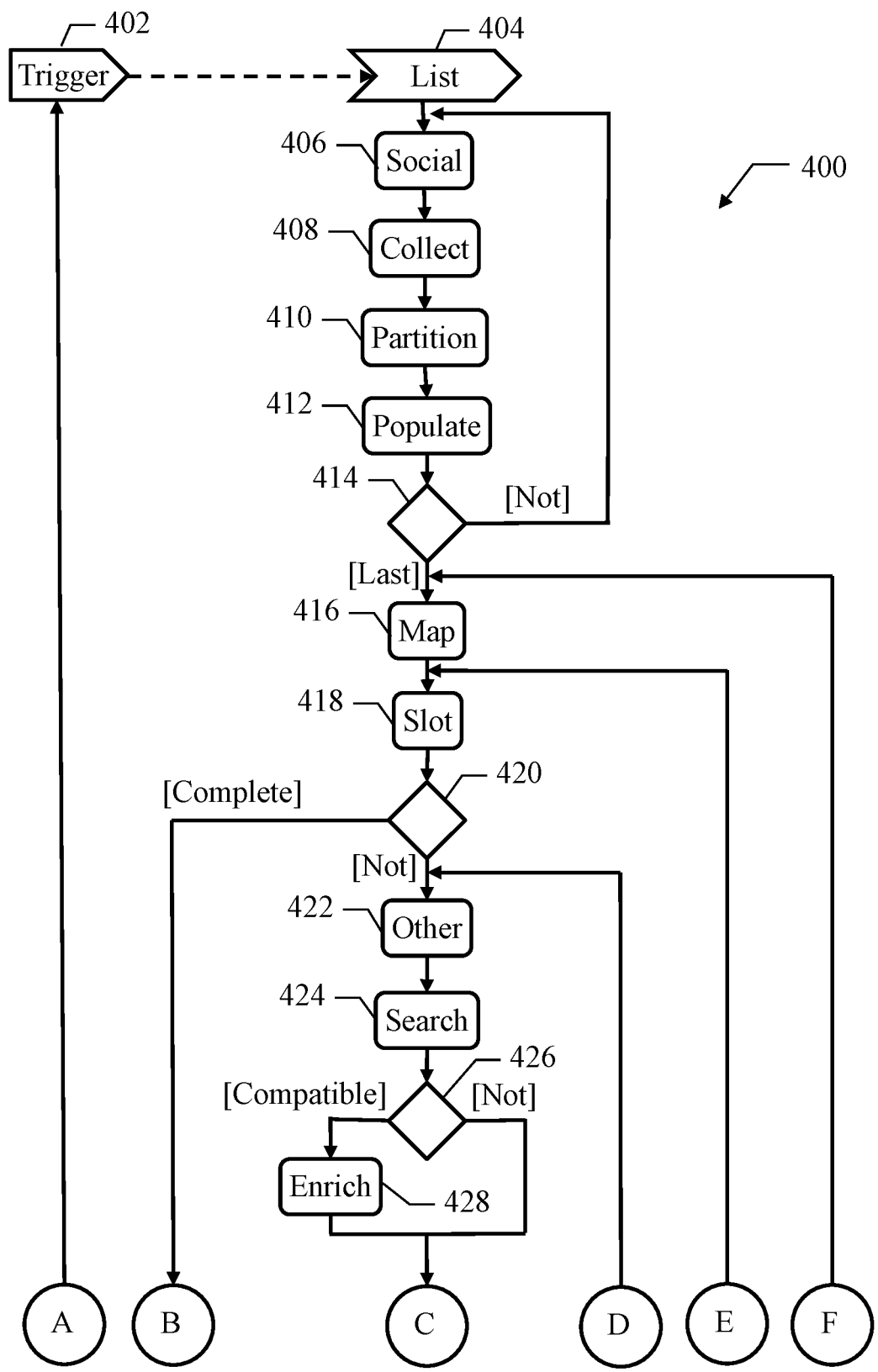
FIG. 4A-FIG. 4C depict activity diagrams describing the flow of activities relating to an implementation of an embodiment of the present invention.
Figure 4B:
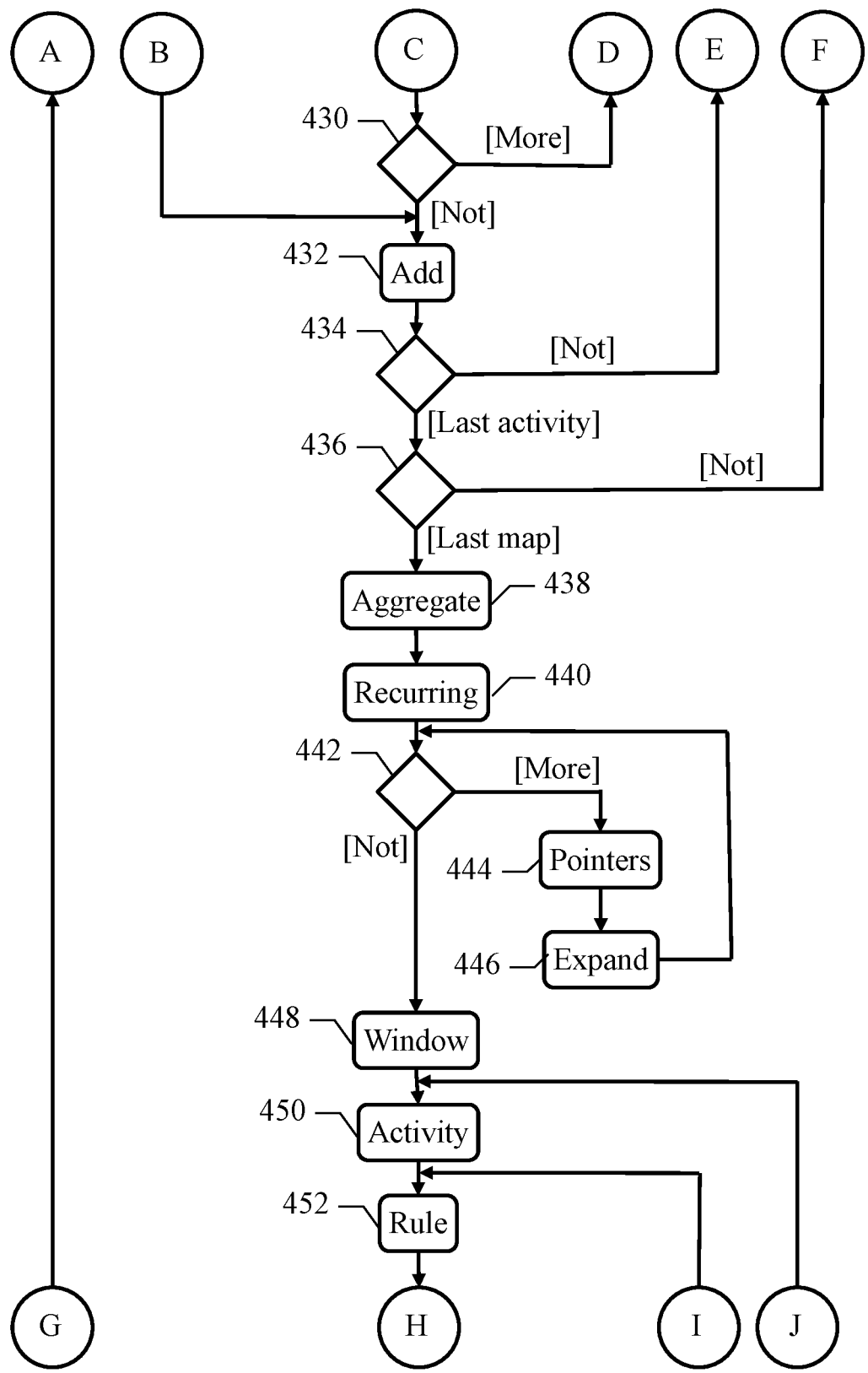
Figure 4C:
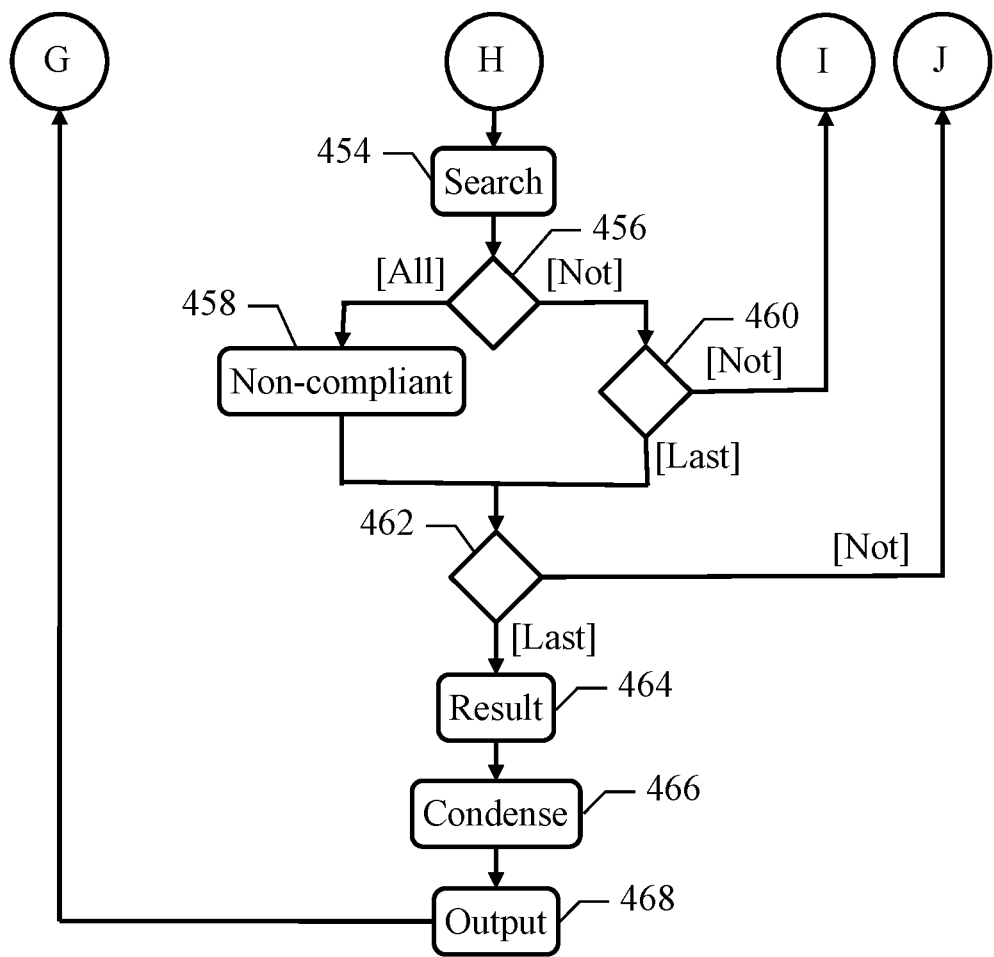

With reference now to FIG. 4A-FIG. 4C, an activity diagram is shown describing the flow of activities relating to an implementation of an embodiment of the present disclosure.

Particularly, the activity diagram represents an exemplary process that may be used to control the information which has been shared by a user in a plurality of social network services with a method 400. In this respect, each block may correspond to one or more executable instructions for implementing the specified logical function on the above-mentioned computers.

The process passes from block 402 to block 404 as soon as a triggering event occurs triggering a control of the information. For example, this may happen periodically (according to a configuration parameter, for example, every day) in an automatic operation mode of the information control application or upon a request of the user in a manual operation mode of the information control application (for example, entered by selecting a corresponding command in a user interface of the information control application). In any case, in response thereto the collector retrieves the list of relevant social network services (social network labels, server identifiers and user identifiers) from the corresponding table.

A loop is then performed for collecting the information pertaining to the user in the relevant social network services. The loop begins at block 406, wherein the collector takes a (current) relevant social network into account (starting from a first one in any arbitrary order). The collector at block 408 collects the information pertaining to the user in the relevant social network service and saves the information into a corresponding new entry of the information repository. For example, the information is obtained by downloading all the contents, filtered according to the user, which have been posted as public in a collection period (such as defined according to a corresponding (control) period in the automatic operation mode or entered by the user in the manual operation mode). For example, the downloading is limited to the contents which have been posted by the user; moreover, it is also possible to extend the downloading to any contents relating to the user (for example, identified by his/her name extracted from a configuration parameter) which have been posted by other users (for example, texts comprising the name, photographs/videos tagged with the name and so on). The analyzer at block 410 partitions the information into a plurality of information segments for the time slots, defined over the collection period according to length (retrieved from a configuration parameter). For example, a time of each content is determined by searching, in the order, the content's metadata (such as tag, property and so on), the content itself (such as with cognitive techniques) or a timestamp set at the posting of the content; the content is then assigned to the information segment of the time slot containing its time. The analyzer at block 412 creates a (new) activity map of the relevant social network service, initializes it with its server identifier and then populates each time slot thereof as far as possible. For this purpose, the analyzer takes the content of the time slot, if any, into account. The content have corresponding times as defined above; the time property is set to an average of the times of the content. A place of each content is determined searching, in the order, in its metadata (such as tag, property and so on) or in the content itself (such as with cognitive techniques); the place property is set to the closest one to the places of the content. Other people involved in the corresponding activity and a reason of the activity are searched (such as with cognitive techniques); the person property and the reason property are set to the corresponding results of the search. The analyzer at block 414 verifies whether a last relevant social network service has been processed. If not, the flow of activity returns to the block 406 to repeat the same operations on a next relevant social network service. Conversely, once all the relevant social network services have been processed, the loop is exit by descending into block 416.

A further loop is then performed for enriching the activity maps. The loop begins with the enricher that takes a (current) activity map into account (starting from a first one in any arbitrary order) and creates a corresponding (new) enriched activity map. The enricher at block 418 takes the activity definition of a (current) time slot in the activity map into account (for example, in chronological order), and it sets the originating pointers of any activity properties thereof accordingly. The enricher at block 420 verifies whether the activity definition is complete, i.e., the activity definition comprises the activity properties of all the property types ("when", "where", "who" and "why" in the example at issue). If the activity definition is not complete, the enricher tries to enrich the activity definition according to the other activity maps. For this purpose, the enricher at block 422 takes a (current) other activity map into account. The enricher at block 424 searches a most recent activity definition in the other activity map comprising one or more additional activity properties ("where", "who" and/or "why"). The enricher at block 426 verifies whether the (most recent) activity definition in the other activity map is compatible with the activity definition in the current activity map. For example, a distance between the corresponding place properties is calculated, if possible, and then a time required to move from the place property of the other activity map to the place property of the current activity map (according to an average speed from a configuration parameter) is compared with a difference between the corresponding time properties. If the activity definitions are compatible, i.e., if the time required to move is (possibly strictly) lower than the difference between the time properties meaning that the user could have moved between the places indicated by the place properties), the enricher at block 428 enriches the activity definition of the current activity map by adding any activity properties in the activity definition of the other activity map which are missing in the activity definition of the current activity map, with their originating pointers set accordingly. The process then continues to block 430; the same point is also reached directly from the block 426 if the activity definitions are incompatible. At this point, the enricher verifies whether any other activity map remains to be taken into account. If so, the flow of activity returns to the block 422 to repeat the same operations on a next other activity map. Conversely, once all the other activity maps have been taken into account, the process continues to block 432; the same point is also reached directly from the block 420 if the activity definition is complete. At this point, enricher adds the activity definition (possibly enriched) into the corresponding entry of the enriched activity map. The enricher at block 434 verifies whether a last activity definition of the activity map has been processed. If not, the flow of activity returns to the block 418 to repeat the same operations on a next activity definition of the activity map. Conversely, once all the activity definitions of the activity map have been processed, the enricher at block 436 verifies whether a last activity map has been processed. If not, the flow of activity returns to the block 416 to repeat the same operations on a next activity map. Conversely, once all the activity maps have been processed, the loop is exit by descending into block 438.

The enriched activity maps so obtained may be used as is, each one providing an indication of an (assumed) life of the user over the collection period (as defined by his/her activities in the corresponding time slots). Optionally, the enricher aggregates the enriched activity maps into a single activity map. Each activity definition of the enriched activity map is generated according to the activity definitions of all the enriched activity maps for the same time slot. For example, the time property is set to an average of all the time properties, the place property is set to the place closest to all the place property, the person property is set to a union of all the person properties and the reason property is set to the most frequent one within all the reason properties (with the corresponding originating pointers). In a different implementation (not shown in the figure), a single enriched activity map is generated directly from the activity maps. For this purpose, the enriched activity map is initialized to the most promising activity map (for example, the one with the highest number of activity properties). For each activity definition in the enriched activity map (either complete or not), the most recent activity definition in each (other) activity map is searched as above; if the activity definition in the activity map is compatible with the activity definition in the enriched activity map (as above), each activity property thereof in the activity map is used to refine the corresponding activity property in the enriched activity map (with its originating pointer set accordingly); for example, the time property in the enriched activity map is updated according to a difference of the time property in the activity map from it, the place property in the enriched activity map is updated according to a distance of the place property in the activity map from it, the person property and the reason property in the activity map are added to the person property and to the reason property, respectively, in the enriched activity map. For the sake of simplicity, in the following the case is considered wherein a single enriched activity map is available (similar considerations apply to each enriched activity map when they are more than one).

The enriched activity map is then expanded in the future (if possible). For this purpose, the enricher at block 440 searches any sequence of (recurring) activities in the enriched activity map, each one defined by a same activity definition (apart from the time property) which repeats periodically. The enricher at block 442 verifies whether any further sequence of recurring activities remains to be processed. If so, the enricher at block 444 sets the backward pointers of a (current) sequence of recurring activities accordingly. Particularly, the backward pointer of each occurrence of the recurring activity (apart from the first one) is set to the time slot of the previous occurrence of the recurring activity. The enricher at block 446 expands the sequence of recurring activities by adding a further occurrence thereof in a corresponding (new) time slot; the further occurrence of the recurring activity has the time property equal to the one of the last occurrence of the recurring activity in the sequence plus its period, the other activity properties ("where", "who" and "why") equal to the ones of the corresponding activity definition and the backward pointer set to the time slot of the (previous) last occurrence of the recurring activity in the sequence. The process then returns to the block 442 to perform the same verification. As soon as no more sequence of recurring activities remains to the processed (always true when none has been found), the flow of activity descends into block 448.

At this point, the activities in the enriched activity map are verified against the security rules (from the corresponding repository). For this purpose, a verification window is taken into account within the enriched activity map (for example, defined in a configuration parameter or entered manually by the user), for example, from one or more days to the whole collection period. A loop is then performed for processing the activity definitions of the verification window. The loop begins at block 450, wherein the activity definition of a (current) time slot is taken into account (for example, in chronological order). The verifier at block 452 takes a (current) security rule into account (starting from a first one in any arbitrary order). The verifiers at block 454 searches the activity types of the security rule in the activity definition. The flow of activity branches at block 456 according to a result of this search. If the activity definition comprises the activity properties of all the activity types of the security rule (meaning that the activity is not compliant with the security rule), the verifier at block 458 adds an identifier of the non-complaint activity (for example, its time slot) to a non-compliance list (initially empty). Conversely, if one or more activity types of the security rule are missing in the activity definition (meaning that the activity is compliant with the security rule), the process descends into block 460 wherein the verifier verifies whether a last security rule has been processed. If not, the flow of activity returns to the block 452 to repeat the same operations on a next security rule. Conversely (once all the security rules have been processed), the process descends into block 462, which is also reached from the block 458. The verifier now verifies whether a last activity definition has been processed. If a last activity definition has not been processed, the flow of activity returns to the block 450 to repeat the same operations on a next activity definition. Conversely (once all the activity definitions have been processed), the loop is exit by descending into block 464.

The verifier then creates a verification result table. For each time slot of the verification window, the verifier adds an entry comprising the activity definition (from the enriched activity map), any originating activity definitions (from the corresponding activity maps via the corresponding originating pointers, with the server identifiers replaced by the corresponding social network labels from the corresponding table), and the possible backward pointer. According to a configuration parameter, this operation is performed indiscriminately (in this case, with the compliance flag that is deasserted when the time slot is comprised in the non-compliance list and it is asserted otherwise) or only for the time slots indicated in the non-compliance list. The verifier at block 466 condenses the verification result table according to a detail level (for example, defined in a configuration parameter or entered manually by the user). The detail level defines a level of detail of the verification result; for example, the detail level may be high (such as every hour), medium (such as morning, afternoon and evening every day) and low (such as every day). The verifier then joints the activity definitions according to the detail level; for example, the verification result table is left unchanged when the detail level corresponds to the time slot; conversely, longer times lots are created by joining the corresponding activity definitions. The output drive at block 468 outputs a verification report based on the verification result table. For example, the verification report has a row for each (possibly condensed) time slot. The row comprises an (activity) description of the any activities performed by the user in the time slot (derived from the corresponding activity definitions); if the verification result table is not limited to the non-compliant activities only, they are differentiated from the compliant activities by a corresponding visual clue (for example, in red instead of black). The verification report further indicates any originating activities (for example, when the user flies over a portion of the activity description based on the corresponding activity property) and the possible backward pointer (for example, when the user flies over a portion of the activity description based on the corresponding time property). This allows the user to act accordingly in the relevant social network services (for example, by deleting one or more contents relating to each non-compliant activity). The process then returns to the block 402 waiting for a next triggering event. Particularly, the user may reiterate it to evaluate whether the actions performed in the relevant social network services have been effective in removing (or at least reducing) the non-complaint activities.

With reference now to FIG. 5A-FIG. 5D, an exemplary scenario is shown of application of an embodiment of the present invention.

FIG. 5A depicts three different activity maps. Particularly, an activity map for a first server identifier (server1) indicates that the user at a certain time (timeA) was at a certain place (placeA) and that the user at another time (timeB) was at another place (placeB) with a certain person (personB) for a certain reason (reasonB). An activity map for a second server identifier (server2) indicates that the user at timeA was with another person (personA), that the user after a certain period (Δt) from the timeB (timeB+Δt) was at placeB with personB for reasonB and that the user at yet another time (timeC) was at yet another place (placeC). An activity map for a third server identifier (server3) indicates that the user at timeA was busy for another reason (reasonA), and that the user at timeC was with yet another person (personC).

Moving to FIG. 5B, a corresponding enriched activity map is shown. The enriched activity map comprises an (enriched) activity definition timeA+placeA (originating pointer to server1 and timeA)+personA (originating pointer to server2 and timeA)+reasonA (originating pointer to server3 and timeA). The enriched activity map comprises an (enriched) activity definition for a recurring activity (placeB+personB+reasonB) at the timeB (originating pointers to server1 and timeB), at the timeB+Δt (originating pointers to server2 and timeB+Δt, and backward pointer to timeB), and in the future at the timeB+2·t (backward pointer to timeB+Δt). The enriched activity map comprises an (enriched) activity definition timeC+placeC (originating pointer to server2 and timeC)+personC (originating pointer to server3 and timeC).

Moving to FIG. 5C, a corresponding verification result table is shown. For example, a security rule indicates that the user does not want to make available to third parties any activities thereof indicating the "time" property, the "place" property, the "person" property and the "reason" property (i.e., NOT(when+where+who+why)). In this case, the activity definitions (placeA+personA+reasonA) at timeA and (placeB+personB+reasonB) at timeB, timeB+Δt, and timeB+2·Δt, are not complaint with the security rule and are then comprised in the verification result table.

Moving to FIG. 5D, a corresponding verification result report is shown. For example, in case the detail level is low (every day), the verification report indicates that the user at the day corresponding to timeA (dayA) was at placeA with personA for reasonA. Moreover, the verification report indicates that the user was at placeB with personB for reasonB at the day corresponding to timeB (dayB) and at the day corresponding to timeB+Δt (dayB+Δt), and that he/she is expected to do the same in the future at the day corresponding to timeB+2·Δt (dayB+2·Δt). If the user flies over personA, he/she may see that this originates from the social network service of server2 at timeA; therefore, the user may access it and delete the corresponding content. Moreover, if the user flies over dayB+2·Δt, he/she may see that the previous (actual) occurrence of the recurring activity was at timeB+Δt; the user may then flies over personB at dayB+Δt to see that this originates from the social network service of server3 at timeB+Δt. Likewise, if the user flies over dayB+Δt, he/she may see that the previous occurrence of the recurring activity was at dayB; the user may then flies over personB at dayB to see that this originates from the social network service of server2 at timeB. Therefore, the user may access the corresponding social network services and delete the corresponding contents.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, the terms "substantially", "about", "approximately" and the like should be understood as "within 10%". Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling information of a subject. However, the information may be of any type (for example, personal information, sensitive information, commercial and/or technical information, and so on) and it may pertain to any subject (for example, a person, a company, an organization and so on).

In an embodiment, the method comprises the following steps which are executed by a control computing system. However, the control computing system may be of any type (see below).

In an embodiment, the method comprises retrieving (by the control computing system) an indication of a plurality of service computing systems. However, the service computing systems may in any number and of any type (for example, implementing social network services, technical publishing services, news services and so on), and they may be retrieved in any way (for example, read from a list provided by the user, discovered automatically and so on).

In an embodiment, the service computing systems store corresponding information bunches pertaining to the subject. However, each information bunch may comprise any number and type of contents (for example, texts, images, videos, audios and so on) pertaining to the subject in any way (for example, posted by the subject, tagged with the subject, relating to the subject, and so on).

In an embodiment, the information bunches are available to third parties. However, the information bunches may be available to any number and type of third parties (for example, everyone, members of a community, friends, followers, and so on).

In an embodiment, the method comprises collecting (by the control computing system) the corresponding information bunches from the service computing systems. However, the information bunches may be collected in any way (for example, downloaded via corresponding requests, commands, queries and so on) and stored in any memory structures (for example, one or more tables, databases, files and so).

In an embodiment, the method comprises generating (by the control computing system) enriched information pertaining to the subject. However, the enriched information may be of any type (for example, relating to activities, business plans, product characteristics and so on) and stored in any memory structures (for example, one or more tables, databases, files and so).

In an embodiment, the enriched information is generated according to a combination of the information bunches. However, the enriched information may be generated in any way (for example, by enriching each information bunch according to the others into corresponding memory structures, with or without aggregating them into a single memory structure, by refining the information bunches directly into a single memory structure, by removing any incongruences in the obtained results and so on).

In an embodiment, the method comprises verifying (by the control computing system) the enriched information against one or more security rules. However, the security rules may be in any number and of any type (for example, based on combinations of information items, with or without other conditions, such as of temporal or geographical nature, and so on) and the verification may be performed in any way (for example, by searching the information items of the security rules in the enriched information, by verifying properties of the enriched information, with simple algorithms, cognitive techniques, artificial intelligence techniques and so on).

In an embodiment, the method comprises outputting (by the control computing system) a verification result. However, the verification result may be output in any way (for example, displayed, printed, transmitted remotely, and so on).

In an embodiment, the verification result is based on a result of said verifying the enriched information. However, the verification result may be of any type (for example, indicating non-complaint information items only, all the information items with the non-complaint ones being highlighted, in the form of a report, a table, a message, and so on). In an embodiment, this causes the subject to control the information bunches on the corresponding service computing systems according to the verification result. However, the verification result may help the subject in any way (for example, by indicating the contents contributing to the non-complaint information items, by suggesting the most relevant contents contributing to the non-complaint information items and so on) to control the information bunches in any way (for example, by deleting them manually, by deleting them automatically, with or without a manual confirmation, and so on).

In an embodiment, the service computing systems provide corresponding social network services. However, the social network services may be of any type (for example, partial, different and additional social network services with respect to the ones mentioned above).

In an embodiment, the information bunches of the subject stored in the service computing systems are pieces of personal information of a user of the corresponding social network services. However, the personal information may be of any type (for example, messages sent by the person, photographs of the person, videos comprising the person and so on).

In an embodiment, the enriched information provides an indication of one or more activities of the user over time. However, the activities may be in any number and of any type (for example, relating to hobbies, dates, meetings and so on).

In an embodiment, the method comprises creating (by the control computing system) corresponding activity maps according to the information bunches. However, each activity map may be created in any way (for example, according to time stamps of the contents, tags of the contents, the contents themselves and so on).

In an embodiment, each of the activity maps comprises corresponding activity definitions indicative of corresponding activities of the user over a plurality of time slots. However, the time slots may be in any number and with any lengths, and each activity may be defined in any way (for example, by activity properties, activity identifiers and so on).

In an embodiment, the method comprises generating (by the control computing system) the enriched information comprising one or more enriched activity maps each comprising corresponding activity definitions indicative of corresponding activities of the user over the time slots. However, the enriched activity maps may be in any number and of any type (either the same or different with respect to the activity maps, for example, referring to the same time slots or to shorter/longer time slots).

In an embodiment, the activity definition for each of the time slots in each of the enriched activity maps is determined by enriching one of the activity definitions for the time slot in the activity maps. However, this result may be achieved in any way (for example, by creating a corresponding enriched activity map from each activity map, with or without aggregating the enriched activity maps at the end, by creating a single enriched activity map from all the activity maps, such as by starting from the most promising activity map or from the most promising information segment for each time slot, and so on).

In an embodiment, the activity definition is enriched according to the activity definitions in the other activity maps. However, this result may be achieved in any way (for example, by using the most recent activity, all the activities referring to the time slot, the activity in the same time slot and so on).

In an embodiment, the method comprises generating (by the control computing system) the activity definition for each of the time slots in each of the enriched activity maps by enriching the activity definition for the time slot in a corresponding one of the activity maps according to a compatibility of a most recent one of the activity definitions with respect to the time slot in each of the other activity maps. However, the compatibility may be determined in any way (for example, according to the time needed to move, the persons that are met, the reasons of the activities and so on).

In an embodiment, each of the activity definitions comprises one or more activity properties indicative of corresponding properties of the corresponding activity. However, the activity properties may be in any number and of any type (for example, relating to time, place, persons, reason and so on, or any combination thereof).

In an embodiment, the activity properties of each of the activities comprise a time property indicative of a time of the activity. However, the time may be indicated in any way (for example, by a value or a range, in terms of hour, day and so on).

In an embodiment, the activity properties of each of the activities comprise a place property indicative of a place of the activity. However, the place may be indicated in any way (for example, name, address, coordinates and so on).

In an embodiment, the activity properties of each of the activities comprise a person property indicative of one or more persons accompanying the user in the activity. However, the persons may be indicated in any way (for example, names, identifiers, roles and so on).

In an embodiment, the activity properties of each of the activities comprise a reason property indicative of a reason of the activity. However, the reason may be indicated in any way (for example, by a description, an identifier and so on).

In an embodiment, the method comprises aggregating (by the control computing system) the enriched activity maps into a single enriched activity map. However, the enriched activity maps may be aggregated in any way (for example, by refining the activities, completing the activities and so on) or this operation may be omitted at all.

In an embodiment, the method comprises expanding (by the control computing system) at least one of the enriched activity maps. However, this operation may be performed for any number of activity maps (down to none).

In an embodiment, the enriched activity map is expanded by adding one or more activity definitions indicative of corresponding activities of the user in corresponding time slots in the future according to the activity definitions of the enriched activity map. However, the enriched activity map may be expanded in any way (for example, according to sequences of recurring activities, activities planned for the future and so on) and with any number of activity definitions in the future.

In an embodiment, the method comprises detecting (by the control computing system) one or more sequences of activity definitions in at least one of the enriched activity maps each indicative of a same activity recurring over time. However, the sequences may be in any number (down to zero) and they may be detected in any way (for example, when an activity is exactly or at least substantially the same, such as with more than a minimum number of activity attributes that are equal or different by less than a maximum value, recurs periodically or according to any regular pattern, and so on).

In an embodiment, the method comprises expanding (by the control computing system) each of enriched activity map wherein the sequences are detected by adding, for each of the corresponding sequences, at least one activity definition indicative of a next occurrence of the corresponding activity. However, the next occurrences may be in any number and added in any way (for example, with the next occurrence defined according to the common part of the definitions of the other occurrences, with the time of the next occurrence defined according to the period or the regular pattern, and so on).

In an embodiment, the method comprises detecting (by the control computing system) one or more non-compliant of the activity definitions in the enriched activity maps indicative of corresponding activities being non-compliant with the security rules. However, the non-compliant activities may be in any number and they may be detect in any way (for example, when they match a single security rule, any combination of two or more security rules, such as defined by logic operators, all the security rules and so on).

In an embodiment, the method comprises generating (by the control computing system) the verification result being based on the non-compliant activity definitions. However, the verification result may be based in any way on the non-compliant activity definitions (for example, their activity properties, with or without any indication of the activities contributing to them, with or without any indication of the corresponding sequence, and so on).

In an embodiment, the method comprises generating (by the control computing system) the verification result being based on one or more of the activity definitions in the activity maps contributing to define each of the non-compliant activity definitions. However, the activity definitions contributing to define each non-compliant activity definition may be indicated in any way (for example, pointers to the corresponding activity maps, identifiers of the corresponding service computing systems, or labels thereof, and their information segments, and so on).

In an embodiment, the method comprises generating (by the control computing system) the verification result being based on one or more of the activity definitions in the enriched activity maps contributing to define each of the non-compliant activity definitions having the corresponding time slot in the future. However, the activity definitions contributing to define each non-compliant activity definition in the future may be indicated in any way (for example, by an indication of a last occurrence of a recurring activity in a corresponding sequence, by an indication of the whole sequence, by an indication of an activity indicating a planning of the non-complaint activity in the future and so on).

In an embodiment, the method comprises causing (by the control computing system) the subject to select a verification window. However, the verification window may be selected in any way (for example, explicitly, such as by indicating its start and end, its start and length, and the like, implicitly, such as by indicating corresponding conditions determining its start and end, and so on).

In an embodiment, the method comprises generating (by the control computing system) the verification result being based on the activity definitions in the enriched activity maps having the corresponding time slots in the verification window. However, the verification result may be generated in any way with reference to the verification window (for example, with or without the possibility of changing a detail level in any way, such as qualitatively or quantitatively, and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program which is configured for causing a computing system to perform the above-mentioned method. An embodiment provides a computer program product for controlling information of a subject. The computer program product comprises a computer readable storage medium that has program instructions embodied therewith. The program instructions are executable by a computing system to cause the computing system to perform the above-mentioned method. However, the computer program may be implemented as a stand-alone module, as a plug-in for a pre-existing software program (for example, the browser) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a computing system comprising means that are configured for performing the steps of the above-described method. An embodiment provides a computing system comprising a circuit (i.e., any hardware suitably configured, for example, by software) for performing the steps of the above-described method. However, the computing system may be of any type (for example, a client of the subject, such as a desktop, a laptop, a tablet, a smartphone and so on, a server offering a corresponding service to one or more subjects, such as a physical machine, a virtual machine, a cloud service and so on) and it may communicate over any network (for example, a global network, a wide area network, a local area network and so on) using any kind of connections (for example, wired or wireless connections, telephone connections, satellite connections and so on) for collecting the information of the subject.

Generally, similar considerations apply if the computing system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   retrieving, by one or more processors, an indication of a plurality of social networks storing corresponding posts, pertaining to a subject, that are available to a third party;
   collecting, by one or more processors, the corresponding posts from the plurality of social networks;
   generating, by one or more processors, enriched information pertaining to the subject according to a combination of information from the posts;
   verifying, by one or more processors, the enriched information against a security rule; and
   responsive to the enriched information being non-compliant with the security rule, outputting, by one or more processors, a result of the verification of the enriched information to the subject, the result comprising the enriched information and respective social network origination information for the enriched information.

2. The computer-implemented method of claim 1, wherein:
   the corresponding posts of the subject, stored to the social networks, include pieces of personal information of a user of the corresponding social networks; and
   the enriched information provides an indication of one or more activities of the user over time.

3. The computer-implemented method of claim 2, further comprising:
   creating, by one or more processors, corresponding activity maps according to the posts, each of the activity maps comprising corresponding activity definitions indicative of corresponding activities of the user over a plurality of time slots; and
   wherein:
   the enriched information comprises one or more enriched activity maps; and
   the activity definition for each of the time slots in each of the enriched activity maps is determined by enriching one of the activity definitions for the time slot in the activity maps according to the activity definitions in the other activity maps.

4. The computer-implemented method of claim 3, further comprising:
   generating, by one or more processors, the activity definition for each of the time slots in each of the enriched activity maps by enriching the activity definition for the time slot in a corresponding activity map, of the activity maps, according to a compatibility of a most recent activity definition, of the activity definitions, with respect to the time slot in each of the other activity maps.

5. The computer-implemented method of claim 3, wherein each of the activity definitions comprise one or more activity properties indicative of corresponding properties of the corresponding activity.

6. The computer-implemented method of claim 5, wherein the activity properties of each of the activities are selected from the group consisting of: (i) a time property, indicative of a time of the activity, (ii) a place property, indicative of a place of the activity, (iii) a person property, indicative of one or more persons accompanying the user in the activity, and (iv) a reason property, indicative of a reason for the activity.

7. The computer-implemented method of claim 3, wherein the one or more enriched activity maps comprise a plurality of enriched activity maps, further comprising:
   aggregating, by one or more processors, the plurality of enriched activity maps into a single enriched activity map.

8. The computer-implemented method of claim 3, further comprising:
   expanding, by one or more processors, a first enriched activity map, of the one or more enriched activity maps, by adding one or more activity definitions indicative of corresponding activities of the user in corresponding future time slots, according to the activity definitions of the enriched activity map.

9. The computer-implemented method of claim 8, further comprising:
   detecting, by one or more processors, one or more sequences of activity definitions in a second enriched activity map, of the one or more enriched activity maps, indicative of a recurring activity over time; and expanding, by one or more processors, the second enriched activity map, based on the detected one or more sequences, by adding, for each of the detected one or more sequences, at least one activity definition indicative of a next occurrence of the corresponding activity.

10. The computer-implemented method of claim 1, further comprising:
receiving, by one or more processors, a selection of a verification window by the subject; and
generating, by one or more processors, the result of the verification based on the activity definitions in the enriched activity maps having the corresponding time slots in the verification window.

11. A computer program product comprising:
one or more computer readable hardware storage media and program instructions stored on the one or more computer readable hardware storage media, the program instructions comprising:
program instructions to retrieve an indication of a plurality of social networks storing corresponding posts, pertaining to a subject, that are available to a third party;
program instructions to collect the corresponding posts from the plurality of social networks;
program instructions to generate enriched information pertaining to the subject according to a combination of information from the posts;
program instructions to verify the enriched information against a security rule; and
program instructions to, responsive to the enriched information being non-compliant with the security rule, output a result of the verification of the enriched information to the subject, the result comprising the enriched information and respective social network origination information for the enriched information.

12. The computer program product of claim 11, wherein:
the corresponding posts of the subject, stored to the social networks, include pieces of personal information of a user of the corresponding social networks; and
the enriched information provides an indication of one or more activities of the user over time.

13. The computer program product of claim 12, further comprising:
program instructions, stored on the one or more computer readable storage media, to create corresponding activity maps according to the posts, each of the activity maps comprising corresponding activity definitions indicative of corresponding activities of the user over a plurality of time slots; and
wherein:
the enriched information comprises one or more enriched activity maps; and
the activity definition for each of the time slots in each of the enriched activity maps is determined by enriching one of the activity definitions for the time slot in the activity maps according to the activity definitions in the other activity maps.

14. The computer program product of claim 13, further comprising:
program instructions, stored on the one or more computer readable storage media, to generate the activity definition for each of the time slots in each of the enriched activity maps by enriching the activity definition for the time slot in a corresponding activity map, of the activity maps, according to a compatibility of a most recent activity definition, of the activity definitions, with respect to the time slot in each of the other activity maps.

15. The computer program product of claim 13, wherein each of the activity definitions comprise one or more activity properties indicative of corresponding properties of the corresponding activity.

16. The computer program product of claim 15, wherein the activity properties of each of the activities are selected from the group consisting of: (i) a time property, indicative of a time of the activity, (ii) a place property, indicative of a place of the activity, (iii) a person property, indicative of one or more persons accompanying the user in the activity, and (iv) a reason property, indicative of a reason for the activity.

17. A computer system comprising:
one or more computer processors, one or more computer readable storage media, and program instructions stored on the one or more computer readable storage media for execution by at least one of the one or more computer processors, the program instructions comprising:
program instructions to retrieve an indication of a plurality of social networks storing corresponding posts, pertaining to a subject, that are available to a third party;
program instructions to collect the corresponding posts from the plurality of social networks;
program instructions to generate enriched information pertaining to the subject according to a combination of information from the posts;
program instructions to verify the enriched information against a security rule; and
program instructions to, responsive to the enriched information being non-compliant with the security rule, output a result of the verification of the enriched information to the subject, the result comprising the enriched information and respective social network origination information for the enriched information.

18. The computer-implemented method of claim 1, wherein the security rule indicates that the user does not want to make available to the third party an activity indicating a time, place, person, and reason.

19. The computer-implemented method of claim 1, further comprising:
automatically deleting, by one or more processors, a first post of the posts based on the enriched information being non-compliant with the security rule.

* * * * *